United States Patent Office 3,631,102
Patented Dec. 28, 1971

3,631,102
**N-AMINOALKYL-2,5-CYCLOHEXADIENE-
1-CARBOXAMIDES**
Venkatachala Lakshmi Narayanan, North Brunswick, Frederic Peter Hauck, Somerville, and Frank Lee Weisenborn, Somerset, N.J., assignors to E. R. Squibb & Sons, Inc., New York, N.Y.
No Drawing. Filed Apr. 23, 1969, Ser. No. 818,839
Int. Cl. C07c 103/44
U.S. Cl. 260—557 R        6 Claims

ABSTRACT OF THE DISCLOSURE

This invention relates to new N-aminoalkyl-2,5-cyclohexadiene-1-carboxamides of the general formula

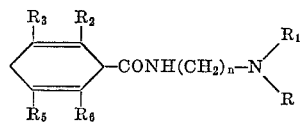

and to acid addition salts thereof.
They are useful as anti-fibrillatory agents.

BRIEF SUMMARY OF THE INVENTION

The invention relates to new compounds of the formula (I)

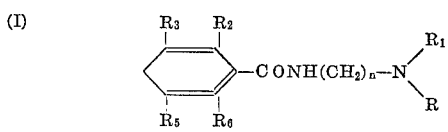

wherein R and $R_1$ each is hydrogen, hydroxy-lower alkyl or phenyl-lower alkyl. They may be the same or different. In addition R and $R_2$ may join together with the nitrogen to which they are attached to form a five to six membered nitrogen heterocyclic. $R_2$, $R_3$, $R_5$ and $R_6$ each is hydrogen, lower alkyl or lower alkoxy, preferably ortho or meta to the amide function, at least two of these R's being hydrogen, $n$ is 2 to 5.

The lower alkyl groups represented by the symbols are straight or branched chain hydrocarbon radicals of up to 7 carbon atoms, e.g., methyl, ethyl, propyl, isopropyl, butyl, isobutyl, t-butyl or the like. The lower alkoxy, hydroxy-lower alkyl and phenyl-lower alkyl groups contain similar alkyl groups attached to the other substituent. The heterocyclic groups formed by the grouping

include piperidino, pyrrolidino, morpholino, piperazino, these rings with a lower alkyl substituent, and hydroxy-lower alkylpiperazino.

DETAILED DESCRIPTION OF THE INVENTION

The new compounds of Formula I may be produced by several alternative methods.
According to one method, a benzamide of the formula (II)

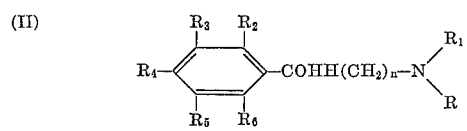

wherein $R_4$ is hydrogen or amino and the other symbols have the same meaning defined above.

may be reduced using an alkali metal such as sodium in liquid ammonia preferably in the presence of an alcohol like ethyl alcohol.

Alternatively, a substituted benzoic acid of the formula (III)

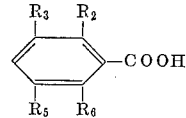

may be reduced under the same conditions described above to obtain a substituted 2,5-cyclohexadiene-1-carboxylic acid of the formula (IV)

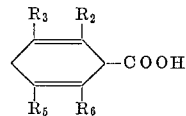

The acid of Formula IV may then be converted to the acid chloride (V)

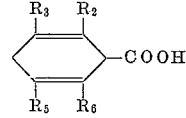

by treatment with oxalyl chloride, thionyl chloride or the like. The reaction of the compound of Formula V with a substituted diamine (VI)

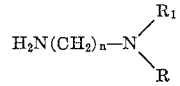

gives the compound of Formula I.

Alternatively, a compound of Formula IV may be reacted directly with a diamine of Formula VI, in the presence of an equivalent amount of dicyclohexylcarbodiimide in an inert solvent like tetrahydrofuran, chloroform, dioxane, methylene chloride or the like to form the compound of Formula I. Purification of the products of Formula I may be effected by chromatography on silver nitrate impregnated silica plates, for example.

In all of the foregoing formulas the symbols have the same meaning described above.

The bases of Formula I form salts by reaction with equivalent amounts of the common inorganic and organic acids. Such salts include the hydrohalides, e.g., hydrobromide, hydrochloride, sulfate, nitrate, phosphate, acetate, citrate, oxalate, tartrate, malate, succinate, benzoate, ascorbate, alkanesulfonate, e.g., methanesulfonate, arylsulfonate, e.g. benzenesulfonate, toluenesulfonate, etc. It is frequently convenient to purify or isolate the product by forming an insoluble salt. The base may be obtained by neutralization and another salt then formed by treatment with the appropriate acid.

Starting materials of Formula IV which may be used to obtain the products of this invention include, for example, benzoic acid, 2-methylbenzoic acid, 2-methoxybenzoic acid, 5-ethylbenzoic acid, 5-methoxybenzoic acid, 2,5-dimethylbenzoic acid, 2,5-dimethoxybenzoic acid, and the like.

Amines of Formula VI which may be used include, for example, ethylenediamine, propylenediamine, 1,3-diaminopropane, 1,4-diaminobutane, N-methylethylenediamine, N,N-dimethylethylenediamine, N,N-diethylethylenediamine, N-hydroxyethylethylenediamine, N-benzylethylenediamine, 2-morpholinoethylamine, 2-pyrrolidinopropylamine, 2 - (4 - hydroxyethylpiperazino)ethylamine and the like.

The new compounds of this invention are useful as antifibrillatory agents, e.g., in arresting cardiac arrhythmia in animals, such as mice or dogs. For this purpose a compound of Formula I or a physiologically acceptable acid addition salt thereof may be incorporated in a conventional dosage form such as tablet, capsule, elixir, injectable or the like along with the necessary carrier material, excipient, lubricant, buffer or the like for oral or parenteral administration in single or divided doses of about 1 to 50 mg./kg./day, preferably about 2 to 15 mg./kg., two to four times daily ($ED_{50}=11$ mg./kg. in mice).

The following examples are illustrative of the invention. All temperatures are expressed on the centigrade scale.

Example 1.—N-[2-diethylamino)ethyl] 2,5-cyclohexadienyl-1-carboxamide

METHOD A (1) 2,5-cyclohexadiene-1-carboxylic acid.—Ten grams (0.082 mole) of benzoic acid are added to 100 ml. of anhydrous ethanol in a 2 l. three-necked flask equipped with a mechanical stirrer and with loose cotton plugs in the side necks. After the benzoic acid has dissolved, 600 ml. of liquid ammonia are added to the stirred solution. Then 6.2 g. (0.27 g. atom) of sodium are added in small pieces. When about one-third of the sodium has been added, the white sodium salt of the acid precipitates, and there is strong foaming of the reaction mixture. After all the sodium has been consumed, as evidenced by the disappearance of the blue color, 14.6 g. (0.27 mole) of ammonium chloride is added cautiously. The mixture is stirred for an additional hour and then allowed to stand until the ammonia has evaporated.

The residue is dissolved in 300 ml. of water. The solution is poured onto 200 g. of ice and acidified to a pH of about 4 by addition of 75 ml. of 10% hydrochloric acid. The resulting mixture is extracted with four 100 ml. portions of peroxide-free ether, and the combined extracts are washed with 50 ml. of a saturated aqueous solution of sodium chloride and dried over 2 g. of anhydrous magnesium sulfate. The ether solution is separated from the drying agent and concentrated at room temperature under reduced pressure. The residual oil is distilled in vacuo to give 9.1 g. (90%) of 2,5-cyclohexadiene-1-carboxylic acid, B.P. 80–98°/0.01 mm.

(2) 2,5-cyclohexadiene-1-carboxylic acid.—To a solution of 12.2 g. (0.1 mole) of 2,5-cyclohexadiene-1-carboxylic acid in 75 ml. of dry benzene, 30 ml. of oxalyl chloride in 25 ml. of benzene are added dropwise with cooling. The reaction mixture is stirred at room temperature for an hour. The solvent and excess oxalyl chloride are removed, and the residual oil is distilled in vacuo to give 7.8 g. (51%) of a liquid, B.P. 80–82°/13–15 mm.

(3) N - [2 - diethylamino)ethyl] - 2,5 - cyclohexadiene-1-carboxamide.—To a solution of 4.7 g. (0.04 mole) of 2-(diethylamino)-ethylamine in 50 ml. of dry benzene, a solution of 5.6 g. of (0.04 mole) of 2,5-cyclohexadiene-1-carboxylic acid chloride in 50 ml. of dry benzene is added dropwise with stirring. The mixture is stirred overnight at room temperature and then heated on a water bath for 15 minutes. The solvent is removed in vacuo, the residue is made basic with dilute potassium carbonate solution, and extracted with chloroform. The chloroform layer is dried ($MgSO_4$) and concentrated to give 6.6 g. (74%) of N-[2-(diethylamino)ethyl]-2,5-cyclohexadiene-1-carboxamide.

The product is purified by chromatography over $AgNO_3$ impregnated silica plates.

METHOD B

A mixture of 3.05 g. (0.025 mole) of 2,5-cyclohexadiene-1-carboxylic acid, 2.9 g. (0.025 mole) of 2-(diethylamino)ethylamine and 5.15 g. (0.025 mole) of dicyclohexylcarbodiimide in 200 ml. of methylene chloride is stirred at room temperature for 70 hours. The precipitate is filtered off, the solution concentrated and dissolved in 200 ml. of chloroform. The chloroform extract is washed with dilute sodium carbonate solution, followed by 3 × 150 ml. washings with water. The organic layer is dried ($MgSO_4$) and concentrated to give 2.9 g. of product. It is purified as in Method A.

METHOD C

A solution of 8.8 g. (0.04 mole) of N-[2-diethylamino)ethyl]]benzamide in 125 ml. of absolute alcohol is added dropwise to 1 liter of liquid ammonia cooled in a Dry Ice-acetone bath. To this rapidly stirring solution, 4.6 g. (0.2 mole) of sodium cut into small pieces are added over a 5 minute period. When the reaction is complete as seen by the disappearance of the blue color, 21 g. of solid ammonium chloride are added and the solution allowed to evaporate overnight. To the residue 500 ml. of water are added and the mixture is extracted with methylene chloride. The extract is washed with water, dried ($MgSO_4$) and concentrated to give 7.1 g. of product. It is purified as in Method A.

Examples 2 to 15

Following the procedure of Example 1 (Method A), the additional compounds shown in the third column of the table below are obtained by utilizing benzoic acid or the substituted benzoic acid in the first column and the diamine in the second column as the principal reactants.

TABLE

| Phenyl substituent | | | n | $-N\begin{smallmatrix}R_1\\R\end{smallmatrix}$ | 2,5-cyclohexadienyl | | n | $-N\begin{smallmatrix}R_1\\R\end{smallmatrix}$ |
|---|---|---|---|---|---|---|---|---|
| Example: | | | | | | | | |
| 2 | | | 3 | $-N\begin{smallmatrix}C_3H_7\\C_3H_7\end{smallmatrix}$ | | | 3 | $-N\begin{smallmatrix}C_3H_7\\C_3H_7\end{smallmatrix}$ |
| 3 | $R_2=CH_3$ | | 2 | $-N\begin{smallmatrix}C_2H_5\\C_2H_5\end{smallmatrix}$ | $R_2=CH_3$ | | 2 | $-N\begin{smallmatrix}C_2H_5\\C_2H_5\end{smallmatrix}$ |
| 4 | $R_2=OCH_3$ | $R_5=OCH_3$ | 2 | $-NHCH_2C_6H_5$ | $R_2=OCH_3$ | $R_5=OCH_3$ | 2 | $-NHCH_2C_6H_5$ |
| 5 | $R_3=CH_3$ | $R_5=CH_3$ | 3 | $-N\bigcirc$ | $R_3=CH_3$ | $R_5=CH_3$ | 3 | $-N\bigcirc$ |

TABLE—Continued

| Example: | Phenyl substituent | n | —N(R₁)(R) | 2,5-cyclohexadienyl | n | —N(R₁)(R) |
|---|---|---|---|---|---|---|
| 6 | $R_3=OCH_3$ | 2 | piperazino | $R_3=OCH_3$ | 2 | piperazino |
| 7 | | 2 | 4-(2-hydroxyethyl)piperazino | | 2 | 4-(2-hydroxyethyl)piperazino |
| 8 | $R_3=CH_3$ | 3 | $-N(CH_2CH_2OH)_2$ | $R_3=CH_3$ | 3 | $-N(CH_2CH_2OH)_2$ |
| 9 | $R_2=CH_3$  $R_5=OCH_3$ | 4 | $-NHCH_3$ | $R_2=CH_3$  $R_5=OCH_3$ | 4 | $-NHCH_3$ |
| 10 | | 3 | morpholino | | 3 | morpholino |
| 11 | $R_3=C_2H_5$ | 2 | $-N(CH_3)_2$ | $R_3=C_2H_5$ | 2 | $-N(CH_3)_2$ |
| 12 | $R_3=OC_2H_5$ | 3 | $-N(C_2H_5)_2$ | $R_3=OC_2H_5$ | 3 | $-N(C_2H_5)_2$ |
| 13 | $R_2=CH_3$  $R_3=CH_3$ | 2 | $-NHCH_3$ | $R_2=CH_3$  $R_3=CH_3$ | 2 | $-NHCH_3$ |
| 14 | $R_2=OCH_3$  $R_6=OCH_3$ | 3 | $-NH_2$ | $R_2=OCH_3$  $R_6=OCH_3$ | 3 | $-NH_2$ |
| 15 | $R_2=C_2H_5$  $R_5=C_2H_5$ | 2 | $-N(C_2H_5)_2$ | $R_2=C_2H_5$  $R_5=C_2H_5$ | 2 | $-N(C_2H_5)_2$ |

Example 16.—N-[2-(diethylamino)ethyl]-2,5-cyclohexadiene-1-carboxamide hydrochloride To a cooled solution of 2.2 g. (0.01 mole) of N-[2-(diethylamino)ethyl] - 2,5-cyclohexadiene-1-carboxamide in 10 ml. of isopropyl alcohol, 10 ml. of 1 N, ethereal-HCl is added. The solvent is evaporated in vacuo, and the product is crystallized from alcohol-ether to give N-[2-(diethylamino)ethyl] - 2,5-cyclohexadiene-1-carboxamide, hydrochloride.

What is claimed is:
1. A compound of the formula

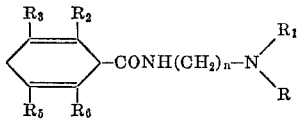

wherein R and $R_1$ each is hydrogen, hydroxy-lower alkyl, phenyl-lower alkyl or together with the nitrogen to which they are attached form a nitrogen heterocyclic of the group consisting of piperidino, pyrrolidino, morpholino, piperazino and hydroxy-lower alkylpiperazino, $R_2$, $R_3$, $R_5$ and $R_6$ each is hydrogen or lower alkyl at least two of $R_2$, $R_3$, $R_5$ and $R_6$ being hydrogen, and $n$ is 2 to 5, and acid addition salts thereof.

2. A compound as in claim 1 wherein R, $R_1$, $R_2$, $R_3$, $R_5$ and $R_6$ each is hydrogen and $n$ is 2.

3. A compound as in claim 1 wherein $R_2$, $R_3$, $R_5$ and $R_6$ each is hydrogen, R and $R_1$ each is lower alkyl and $n$ is 2.

4. A compound as in claim 1 wherein $R_2$, $R_3$, $R_5$ and $R_6$ each is hydrogen, R and $R_1$ each is ethyl and $n$ is 2.

5. A compound as in claim 1 wherein two of $R_2$, $R_3$, $R_5$ and $R_6$ are ethyl and the other two are hydrogen, R and $R_1$ each is ethyl and $n$ is 2.

6. A compound as in claim 1 wherein R, $R_1$, $R_2$ and $R_5$ each is ethyl, $R_3$ and $R_6$ each is hydrogen and $n$ is 2.

References Cited

Kuehne et al.: J. Am. Chem. Soc., vol. 81, pp. 4278–87 (1959).

HENRY R. JILES, Primary Examiner

H. I. MOATZ, Assistant Examiner

U.S. Cl. X.R.

260—247.2 A, 268 R, 294 A, 326.3, 514 R, 544.2; 424—248, 250, 267, 274, 324

PO-1050
(5/69)

UNITED STATES PATENT OFFICE
CERTIFICATE OF CORRECTION

Patent No. 3,631,102                    Dated December 28, 1971

Inventor(s) Venkatachala Lakshmi Narayanan et al.

It is certified that error appears in the above-identified patent and that said Letters Patent are hereby corrected as shown below:

Column 1, formula (I) should read as follows --

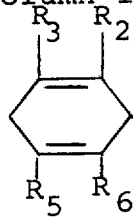 —CONH(CH$_2$)$_n$—N$\langle{}^{R_1}_{R}$   --  Column 1, formula (II)

should read as follows --

R$_4$—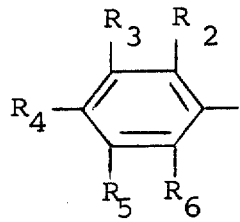—CONH(CH$_2$)$_n$—N$\langle{}^{R_1}_{R}$  -- Column 2, formula (V)

should read as follows --

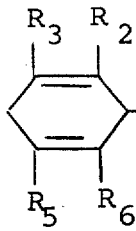—COCl   --   Column 6,   --Claim 2 should be cancelled and Claims 3 to 6 should be renumbered as Claims 2 to 5. --

Signed and sealed this 10th day of July 1973.

(SEAL)
Attest:

EDWARD M. FLETCHER, JR.                Rene Tegtmeyer
Attesting Officer                      Acting Commissioner of Patents